July 27, 1937.  T. J. BAGLEY ET AL  2,088,561

LIQUID TIRE COVER

Filed Feb. 23, 1937

INVENTOR
Thomas J. Bagley
BY Victor M. Mantz
Leonard L. Kalish
ATTORNEY

Patented July 27, 1937

2,088,561

UNITED STATES PATENT OFFICE 2,088,561

LIQUID TIRE COVER

Thomas J. Bagley, Haddonfield, N. J., and Victor M. Mantz, Philadelphia, Pa., assignors to R. M. Hollingshead Corporation, Camden, N. J., a corporation of New Jersey Application February 23, 1937, Serial No. 126,970

20 Claims. (Cl. 152—13)

The present invention relates to a new and useful liquid tire cover for the side-walls of elastic or flexible pneumatic rubber tires or composite laminated rubber tires; the principal features of which liquid tire covers have heretofore been disclosed in our earlier-filed and co-pending application Serial No. 44,388 filed October 10, 1935, of which the following specification is a continuation, in part.

The present invention relates more particularly to a liquid tire cover for the exterior side walls of a pneumatic tire, which cover may be applied to the exterior side wall surfaces of pneumatic rubber tires, in situ, and which, upon such application, will be firmly bound to the side walls of the rubber tire and will, in effect, become an integral part thereof capable of the same flexing as the side wall of the tire itself without any cracking, peeling or separation from the side wall of the tire;—all without the use of the usual molding steps and without the usual application of heat incident to the original building or formation of the tire.

In the accompanying drawing in which like reference characters indicate like parts:

Figure 1:
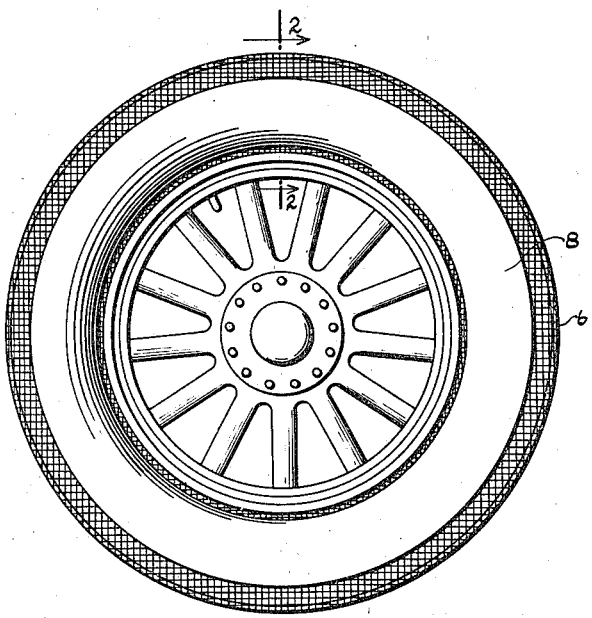
Figure 1 represents a side elevational view of an elastic rubber tire of any conventional construction or formation having on its side wall the tire cover embodying the present invention.
Figure 2:
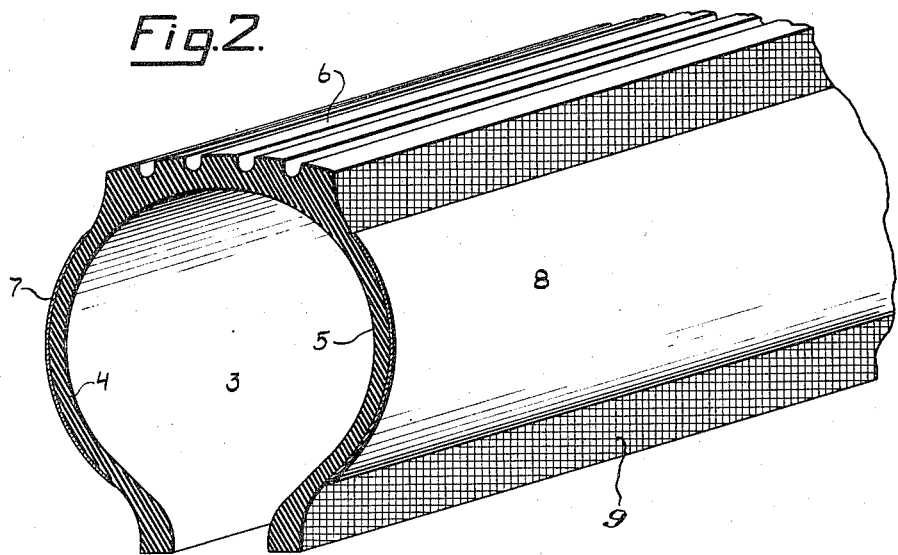
Figure 2 represents a fragmentary perspective sectional view taken generally on line 2—2 of Figure 1, and shown on a much enlarged scale, showing the tire cover of the present invention, in situ.

Thus, according to the present invention, a thin elastic tire cover of white or any color, such as the thin outer layers 7 and 8, shown in the drawing, may be applied in situ to the side walls 4 and 5 of any conventional pre-formed tire 3 intermediate the tread portion 6 of such tire and the bead portion 9 thereof.

The present invention further relates to a certain new and useful method or process of making the liquid tire cover whereby a substantially permanent suspension of the solid pigment may be obtained without the separation or settling whereby the suspension of the solid pigment in the liquid may be similar to a colloidal suspension.

With the above and other objects in view, which will appear more fully from the following detailed description, the present invention contemplates first suspending the finely comminuted solid pigment material in a plastic, and then dissolving the plastic in the liquid in which the solid pigment is to be suspended or an intermediate plastic-solvent liquid miscible with the first mentioned liquid, whereby the plastic material used may form varying proportions of the final product, and may, in some instances, be a very small and negligible portion of the final product or may be a substantial part of the final product, as the case may be;—the plastic acting to some extent as a protective agent, protective colloid, or suspensive agent to the solids, or possibly in the nature of a catalytic agent in relation to the suspension of the solid in the liquid, since the amount of plastic in the final product may, as stated, be extremely small, and still a satisfactory permanent suspension of the solid is obtainable;—although not a catalytic agent in the usual sense of that term.

One practice of the present invention contemplates the suspension or intimate dispersion of the finely comminuted solid in or through rubber, and the solution of the rubber in a liquid which will dissolve the rubber.

Thus, according to the present invention, rubber is first prepared so as to enable it to receive finely comminuted solids. Thus, for instance, the rubber may be used in latex form or the like, or as in the preferred embodiment of the present invention, dried rubber is put on a rubber mill and milled until it is comparatively plastic. Then, the finely comminuted solid pigment material is milled into the rubber until it is intimately and uniformly dispersed through or suspended in the plastic rubber. Thereafter, the plastic rubber is dissolved in the liquid in which the finely comminuted solid is to be suspended, or in an intermediate liquid, if the ultimate liquid is, in and of itself, not a good solvent for rubber or for other reasons;—this solution being effected by heating and stirring until a complete solution of the pigment-bearing plastic rubber is obtained.

The mixture thus produced may then be used as a base which can be added in small quantities to any other liquid which is miscible therewith, or can be diluted with any liquid miscible therewith, and in which the solid suspension is desired.

In one embodiment of the present invention, finely comminuted titanium dioxide is milled into rubber or is otherwise incorporated into rubber in substantial proportions, as for instance, sixty pounds of titanium dioxide to forty pounds of rubber, more or less, until a thoroughly co-mingled mass is obtained, in which the titanium dioxide is intimately associated with the rubber and is uniformly and homogeneously dispersed through the rubber or suspended in the rubber. The titanium dioxide-bearing rubber is then dissolved in any suitable solvent such as gasoline, benzol, xylol or suitable coal tar derivative solvents of rubber, or in light mineral oils or fatty oils or a light petroleum distillate or other organic solvents of rubber, so that the rubber is dissolved. This solution is then used as a base for mixing with other liquids in which the titanium dioxide is to be permanently suspended.

The base liquid thus produced is used for permanently suspending and thus effectively incorporating the titanium dioxide or other pigment materials in an excess of volatile solvent for forming a liquid coating material for the side-walls of pneumatic automobile tires, or so-called "liquid tire cover". Thus, by diluting the titanium-dioxide-bearing rubber or other pigment-bearing rubber solution with a mixture of benzol and xylol, or by dissolving it further in such benzol or xylol mixture, or in a suitable petroleum distillate a highly permanent paint-like coating material is obtained with minimum settling qualities and perhaps even without any settling whatever of the solids.

Whether the titanium dioxide-bearing rubber or the pigment-bearing rubber is dissolved in the first instance in an intermediate solvent with an initially relatively high concentration of rubber for intermediate solvent, or whether the titanium dioxide-bearing or pigment-bearing rubber is dissolved in the first instance in the ultimate solvent, the amount of rubber in the final liquid tire cover is less than the amount of solvent in such liquid tire cover;—the solvent in the resultant liquid tire cover also having the effect of temporary softening the rubber of the outer side wall of the pneumatic tire to which the liquid tire cover is applied, so that as the liquid tire cover "sets" in situ, a firm and generally homogeneous and integral bond or union is obtained between the original rubber in the side wall of the pneumatic tire and the rubber layer so subsequently applied to the side wall and "set" in situ, so that there will be no peeling or separation between the original rubber of the side wall of the tire and the so subsequently applied rubber tire cover.

A typical composition illustrative of the liquid tire cover of the present invention would be eight and one-half percent (8½%) of generally pure dry rubber of commercial grade, sixteen and one-quarter (16¼%) percent of pigment (of the general specific gravity of titanium dioxide), and seventy-five and one-quarter (75¼%) percent of solvent. With pigments of higher specific gravity, the proportion of pigment (by weight) may be increased more or less in proportion to the increase in specific gravity of the pigment (white lead, for instance). Similarly, with pigments of lower specific gravity, the proportion of pigment may be decreased more or less in proportion to the decrease in specific gravity.

The rubber is first worked on a rubber mill until it is plastic and then the finely comminuted dry pigment is added to the rubber while it is being worked on the rubber mill, and it is thoroughly worked into the rubber until it is uniformly disseminated through the dry rubber. Then the pigment-bearing rubber is dissolved in approximately one-third of the ultimate solvent content of the final liquid tire cover, or in the ratio of about 25 parts solvent to 8½ parts rubber and to the 16¼ parts pigment. This initial solution may require some heating so as to force the rubber into solution. This gives a fairly viscous material which is then further cut or thinned with the rest of the ultimate solvent or about 50 parts of solvent, making a total of about 75 parts of solvent in the final liquid tire.

The initial solvent may be benzol or xylol, although xylol is preferable, and mixtures of the two may be used. Thereafter the cutting or dilution may be done with a light petroleum distillate or other suitable solvent, to make a total of approximately seventy-five (75%) percent (more or less) of volatile solvents in the final mixture.

As hereinabove stated, the rubber is first worked or milled on a rubber mill until it is plastic. This milling of the dry rubber alters the physical structure of the rubber in such a way that a greater amount of rubber may be united with solvent without getting an unduly viscous resultant mixture. Thus, by milling the rubber, the same viscosity of rubber-pigment-solvent mixture may be made to contain more rubber than would be possible if the rubber had not been milled. Thus, the milling or working of the rubber breaks down the physical structure or what may be referred to as the "fibre" of the rubber. We have found that such "broken-down" rubber produces a liquid tire cover superior in many respects to one in which the rubber has not been "broken-down".

It is believed that when the liquid tire cover of the present invention is applied to the side wall of a tire, the vulcanizing and accelerating ingredients in the side wall of the tire migrate, in time, into the thin outer coating produced by the liquid tire cover of the present invention, and thereby in time tend to effect a partial vulcanization of such thin outer film produced by the liquid tire cover of the present invention. This perhaps partly accounts for the exceptional and unexpected durability and permanence of the liquid tire cover of the present invention when applied to the side wall of a tire.

The liquid tire cover of the present invention may also include certain other and additional ingredients which have been found materially to improve the ultimate usefulness of the liquid tire cover of the present invention.

Thus, it has been found that by incorporating in the liquid tire cover of the present invention reagents capable of neutralizing or counteracting the discolorizing effect of the anti-oxidants used in the body of the tire, the discoloration of the tire cover of the present invention is minimized and indeed, entirely eliminated.

Thus, in the manufacture of automobile tires it is customary to incorporate certain anti-oxidants in the compounding of the rubber. These anti-oxidants are generally organic compounds of the amine family or group. These and other conventional anti-oxidants used in the original manufacture of the tire, while not noticeable in ordinary black side wall tires, do produce a noticeable discoloration of white side-wall tires because the amines break down slightly in the course of time and produce a coloration. This coloration migrates through a rubber layer which is otherwise free of these anti-oxidants and eventually appears on the surface of the side-wall of the tire.

By incorporating mildly acid buffer agents, such as stannous chloride or alum, or other similar mildly acid mineral salts, in the liquid tire cover of the present invention, the tendency of the tire cover of the present invention to discolor in time is overcome and the original color, whether it be white or any other light color or tint or pastel shade, can be preserved indefinitely without discoloration from the migratory anti-oxidants used in the body of the tire.

Thus, finely powdered or finely comminuted alum or stannous chloride, or other mildly acid mineral salts or inorganic salts, are incorporated into the rubber while the rubber is on the rubber mill in the plastic condition and before any solvent is added to the rubber. This can be done simultaneously with the addition of the pigment herein above referred to, or it may be added before the addition of the pigment or after the addition of the pigment, but preferably while the dry rubber is being worked on the rubber mill. These dry salts so added in very small quantities serve to neutralize the effect of any anti-oxidants which may migrate into the "tire cover" layer produced by the liquid tire cover of the present invention. The amount of such anti-discoloring agent may be as little as one (1%) per cent of the total mixture, or even less, although it may vary within any reasonable range. Needless to say, the slightest addition of such anti-discolorizing agent will perform the function here intended in proportion to the amount incorporated. Thus, for instance, as much as a quarter of one percent (¼%) might be used, or as much as two (2%) or three (3%) percent, or even more, might be used.

As an illustration of the use of anti-discolorizing agents in the liquid tire cover of the present invention, the following may be presented as a typical composition:—8.56% of generally dry rubber, plus 15.40% of pigment, such as titanium dioxide, plus .86% of commercial alum in a finely powdered state, plus 75.18% of volatile solvent, such as benzol, xylol, petroleum distillates, or other organic solvents of rubber.

It will be understood that portions given in either of the foregoing examples are merely illustrative and not restrictive, as these portions can be varied within reasonable range.

It will be observed, however, that the amount of solvent in the liquid tire cover of the present invention is much in excess of the amount of rubber present, and is indeed several times the amount of rubber (the figures and proportions above indicated being by weight rather than by volume).

Likewise, the amount of pigment in relation to the amount of rubber is preferably such that there is more pigment by weight than rubber by weight in the liquid tire cover. This may vary, however, according to the character of the pigment, or according to the specific gravity of the pigment as hereinabove pointed out. In any event, however, both the rubber content, the pigment content and the solvent content may vary.

While the titanium-dioxide, hereinabove specifically referred to, produces a white liquid tire cover, and while any of the well-known pigments may be used for producing other colors, some titanium-dioxide or some equivalent white opaque material may be used in combination with pigments of any desired color. Thus, the liquid tire cover of the present invention may be made in any suitable color by mixing some colored pigment with titanium-dioxide, in suitable proportions depending on the density of color desired. In the preferred embodiments, only relatively light tints or pastel shades of color are produced, although the colored liquid tire covers may also be produced in dark shades of any color.

As a further modification of the hereinabove described liquid tire cover, halogenated rubber may be used in place of some other rubber or in addition to the rubber content hereinabove outlined.

As a further modification of the liquid tire cover hereinabove described, rubber-like hydrocarbons or synthetic amorphous organic rubber-like elastic materials, as for instance, those commercially known as "duprene" and "thiokol" and "vistanex" may be used with their corresponding volatile organic solvents.

The term "rubber" hereinafter used is intended to cover all the foregoing modifications and equivalents.

While the several specific percentages hereinabove illustrated are representative of proportions which have been found satisfactory, it is to be understood that the present invention is not limited to the specific proportions hereinabove set forth for purposes of illustration.

We have found, however, that certain range of proportions are preferable, and indeed, produce results which are much improved over the results produced by proportions beyond such range. Thus, we have found that the ratio of rubber (or other elastic amorphous organic material) to titanium dioxide or other solid pigment should be such that the amount of rubber (or other elastic amorphous organic material) shall preferably be not less than one-fifth, or still more preferably not less than one-fourth the amount of titanium dioxide (or other solid pigment) by weight, and preferably (though not necessarily) less than the amount of titanium oxide or other pigment, or preferably (though not necessarily) at least not substantially more than such titanium oxide or pigment. Likewise, the combined rubber (or other amorphous elastic organic material) and titanium dioxide or other solid pigment shall preferably be substantially less (by weight) than the amount of solvent.

This preferred ratio of not less than one-fifth pigment to rubber would be varied generally according to the variations of specific gravity of pigment used. Thus, with pigments of higher specific gravity, the ratio of rubber to pigment would be correspondingly less or the ratio of pigment to rubber would be correspondingly greater. While heavier pigments, such as white lead, zinc oxide, lithopone or antimony oxide ("timinox") may be used, the titanium dioxide is preferred in the most improved embodiment of the present invention.

By the use of somewhat less volatile solvents the "setting" of the liquid tire cover (after its application to the side-wall of the tire), may be slowed up somewhat so as to insure a firmer and more secure bonding of the "cover" so applied to the original rubber in the side wall of the tire. Thus, by using one of the more volatile solvents having greater dissolving power in the relation to rubber for the first or initial solution of the pigment bearing rubber and then cutting the resultant mixture with one of the less volatile solvents, the volatility of the final product may be suitably diminished to any desired point;— the desideratum being to give an evaporation time element when the liquid tire cover is applied to the side wall of a tire under average atmospheric conditions or temperature conditions, which will enable the solvents to soften the original rubber of the side of the tire sufficiently prior to the ultimate "setting" of the applied "tire cover" as to insure a firm and secure bond between the original rubber and the "tire cover". Nevertheless, the liquid content of the liquid tire cover must possess sufficient volatility to permit the "setting" of the tire cover in situ, within a reasonable length of time. In this respect, the penetration of the solvent contact of the liquid tire cover into the original rubber of the tire is aided by the slight coagulation of the surface of the applied liquid tire cover which retards the evaporation of the rest of the solvent content.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

Having thus described the invention, what is hereby claimed as new and desired to be secured by Letters Patent, is:

1. A liquid tire cover for use on the outer sidewalls of vulcanized pneumatic tire casings, comprising a relatively volatile organic solvent having a finely comminuted solid pigment suspended therein by rubber intimately commingled with said solid pigment prior to the final suspension of the pigment in the ultimate proportion of solvent, the amount of rubber in the final product being less than the amount of the solvent therein, whereby the excess of solvent softens the rubber of the tire, and forms a bond between the tire and the coating when the latter sets in situ.

2. A liquid tire cover for use on the outer sidewalls of vulcanized pneumatic tire casings comprising a relatively volatile organic solvent having finely comminuted titanium dioxide particles suspended therein by rubber intimately commingled with said titanium dioxide particles prior to suspension;—the amount of rubber being less than the amount of solvent, whereby the excess of solvent softens the rubber of the tire and forms a bond between the tire and the coating when the latter sets in situ.

3. A vulcanized, pneumatic automobile tire including tread portion and side wall portions having on its side wall an external coating layer applied thereto in a liquid state, said coating, in its liquid state comprising a volatile organic solvent having finely comminuted particles of titanium dioxide suspended therein by rubber intimately commingled with said titanium dioxide particles prior to suspension;—the amount of rubber being less than the amount of the solvent and from which the volatile solvent has been substantially evaporated in situ, whereby the excess of solvent softens the rubber of the tire and forms a bond between the tire and the coating when the latter sets in situ.

4. A liquid tire cover for use on the outer sidewalls of vulcanized pneumatic tire casings comprising a relatively volatile organic solvent having finely comminuted solid pigment particles suspended therein by rubber intimately commingled with said solid pigment particles prior to suspension;—the amount of rubber being less than the amount of solvent, whereby the excess of solvent softens the rubber of the tire and forms a bond between the tire and the coating when the latter sets in situ.

5. A vulcanized, pneumatic automobile tire including tread portion and side wall portions having on its side wall an external coating layer applied thereto in a liquid state, said coating, in its liquid state comprising a volatile organic solvent having finely comminuted particles of solid pigment suspended therein by rubber intimately commingled with said solid pigment particles prior to suspension;—the amount of rubber being less than the amount of the solvent and from which the volatile solvent has been substantially evaporated in situ, whereby the excess of solvent softens the rubber of the tire and forms a bond between the tire and the coating when the latter sets in situ.

6. A liquid tire cover for use on the outer sidewalls of vulcanized pneumatic tire casings including a relatively dilute solution of rubber in a volatile organic solvent, and a finely comminuted solid pigment suspended in said relatively dilute rubber solution by intimate commingling of said solid pigment with the rubber while the rubber is more concentrated and prior to the ultimate solution and dilution of the rubber, whereby a bond may be formed between the side wall of a tire and said liquid tire coating when the latter sets in situ.

7. A liquid tire cover for use on the outer sidewalls of vulcanized pneumatic tire casings including a relatively dilute solution of rubber in a volatile organic solvent, and a finely comminuted titanium oxide suspended in said relatively dilute rubber solution by intimate commingling of said titanium oxide with the rubber while the rubber is more concentrated and prior to the ultimate solution and dilution of the rubber, whereby a bond may be formed between the side wall of a tire and said liquid tire coating when the latter sets in situ.

8. A liquid tire cover for use on the outer sidewalls of vulcanized pneumatic tire casings including a relatively dilute solution of rubber in a volatile organic solvent, and a finely comminuted solid pigment suspended in said relatively dilute rubber solution by intimate commingling of said solid pigment with the rubber while the rubber is more concentrated and prior to the ultimate solution and dilution of the rubber, whereby a bond may be formed between the side wall of a tire and said liquid tire coating when the latter sets in situ, and a relatively non-volatile anti-discolorizing agent in said rubber solution.

9. A liquid tire cover for use on the outer sidewalls of vulcanized pneumatic tire casings including a relatively dilute solution of rubber in a volatile organic solvent, and a finely comminuted titanium oxide suspended in said relatively dilute rubber solution by intimate commingling of said titanium oxide with the rubber while the rubber is more concentrated and prior to the ultimate solution and dilution of the rubber, whereby a bond may be formed between the side wall of a tire and said liquid tire coating when the latter sets in situ, and a relatively non-volatile anti-discolorizing agent in said rubber solution.

10. A vulcanized, pneumatic automobile tire including tread portion and side wall portions having on its side wall an external coating layer applied thereto in a liquid state, said coating layer, in its liquid state, including volatile organic solvent, rubber dissolved therein, and a finely comminuted solid pigment suspended therein, the amount of rubber being not less than one-fifth the amount of the pigment, by weight, and the combined weight of rubber and pigment being less than the weight of the solvent, whereby the excess of solvent softens the rubber of the tire and forms a bond between the tire and the coating when the latter sets in situ, and whereby said coating of rubber and pigment on the side wall of the tire will be substantially elastic.

11. A vulcanized, pneumatic automobile tire including tread portion and side wall portions having on its side wall an external coating layer applied thereto in a liquid state, said coating layer, in its liquid state, including volatile organic solvent, rubber dissolved therein, and a finely comminuted titanium oxide suspended therein, the amount of rubber being not less than one-fifth the amount of the titanium oxide, by weight, and the combined weight of rubber and titanium oxide being less than the weight of the solvent, whereby the excess of solvent softens the rubber of the tire and forms a bond between the tire and the coating when the latter sets in situ, and whereby said coating of rubber and titanium oxide on the side wall of the tire will be substantially elastic.

12. A vulcanized, pneumatic automobile tire including tread portion and side wall portions having on its side wall an external coating layer applied thereto in a liquid state, said coating layer, in its liquid state, including volatile organic solvent, rubber dissolved therein and a finely comminuted solid pigment suspended therein, the amount of rubber being not less than one-fifth the amount of the pigment, the combined weight of rubber and pigment being less than the weight of the solvent, and a relatively non-volatile anti-discolorizing agent, whereby the excess of solvent softens the rubber of the tire and forms a bond between the tire and the coating when the latter sets in situ, and whereby said coating of rubber and pigment on the side wall of the tire will be substantially elastic.

13. A vulcanized, pneumatic automobile tire including tread portion and side wall portions having on its side wall an external coating layer applied thereto in a liquid state, said coating layer, in its liquid state, including volatile organic solvent, rubber dissolved therein and finely comminuted titanium dioxide suspended therein, the amount of rubber being not less than one-fifth the amount of the titanium oxide, by weight, the combined weight of rubber and titanium oxide being less than the weight of the solvent, and a relatively non-volatile anti-discolorizing agent, whereby the excess of solvent softens the rubber of the tire and forms a bond between the tire and the coating when the latter sets in situ, and whereby said coating of rubber and titanium oxide on the side wall of the tire will be substantially elastic.

14. A tire cover for use on the outer side-walls of vulcanized pneumatic tire casings, including a solution of rubber in a volatile organic solvent, and finely comminuted solid pigment intimately commingled therewith and suspended therein, which tire cover will set, in situ, when applied to the side-wall of a vulcanized tire casing; the ratio of rubber to pigment being such as to form an elastic covering layer bonded to said side-wall and capable of flexing with the tire without cracking or peeling.

15. A vulcanized, pneumatic automobile tire casing including tread portion and side-wall portions of vulcanized rubber, having on its side-wall an external elastic covering layer applied thereto in a liquid state, and bonded thereto, said covering in its liquid state comprising a volatile organic solvent having finely comminuted particles of a solid pigment suspended therein by rubber intimately commingled therewith, the amount of rubber being less than the amount of solvent and from which the volatile solvent has been substantially evaporated in situ; the ratio of rubber to pigment being such that the said covering layer will be capable of flexing with the tire without cracking or peeling.

16. A tire cover for use on the outer side-walls of vulcanized pneumatic tire casings, including a solution of rubber in a volatile organic solvent, and finely comminuted solid titanium oxide intimately commingled therewith and suspended therein, which tire cover will set, in situ, when applied to the side-wall of a vulcanized tire casing; the ratio of rubber to titanium oxide being such as to form an elastic covering layer bonded to said side-wall and capable of flexing with the tire without cracking or peeling.

17. A vulcanized, pneumatic automobile tire casing including tread portion and side-wall portions of vulcanized rubber, having on its side-wall an external elastic covering layer applied thereto in a liquid state, and bonded thereto, said covering in its liquid state comprising a volatile organic solvent having finely comminuted particles of titanium oxide suspended therein by rubber intimately commingled therewith, the amount of rubber being less than the amount of solvent and from which the volatile solvent has been substantially evaporated in situ; the ratio of rubber to titanium oxide being such that the said covering layer will be capable of flexing with the tire without cracking or peeling.

18. A tire cover for use on the outer side-walls of vulcanized pneumatic tire casings, including a solution of rubber in a volatile organic solvent, and finely comminuted solid pigment intimately commingled therewith and suspended therein, which tire cover will set, in situ, when applied to the side-wall of a vulcanized tire casing; the ratio of rubber to pigment being such as to form an elastic covering layer bonded to said side-wall and capable of flexing with the tire without cracking or peeling, and a relatively non-volatile anti-discolorizing agent in said rubber solution.

19. A vulcanized, pneumatic automobile tire casing including tread portion and side-wall portions of vulcanized rubber, having on its side-wall an external elastic covering layer applied thereto in a liquid state, and bonded thereto, said covering in its liquid state comprising a volatile organic solvent having finely comminuted particles of a solid pigment suspended therein by rubber intimately commingled therewith, the amount of rubber being less than the amount of solvent and from which the volatile solvent has been substantially evaporated in situ; the ratio of rubber to pigment being such that the said covering layer will be capable of flexing with the tire without cracking or peeling, and a relatively non-volatile anti-discolorizing agent in said rubber solution.

20. A tire cover for use on the outer side-walls of vulcanized pneumatic tire casings, including a solution of rubber in a volatile organic solvent, and finely comminuted titanium oxide intimately commingled therewith and suspended therein, which tire cover will set, in situ, when applied to the side-wall of a vulcanized tire casing; the ratio of rubber to titanium oxide being such as to form an elastic covering layer bonded to said side-wall and capable of flexing with the tire without cracking or peeling, and a relatively non-volatile anti-discolorizing agent in said rubber solution.

THOMAS J. BAGLEY.
VICTOR M. MANTZ.